United States Patent
Jeong

(10) Patent No.: US 9,798,106 B2
(45) Date of Patent: Oct. 24, 2017

(54) IMAGING LENS

(71) Applicant: LG Innotek Co., Ltd., Seoul (KR)

(72) Inventor: Hyejung Jeong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/018,153

(22) Filed: Feb. 8, 2016

(65) Prior Publication Data
US 2016/0154206 A1    Jun. 2, 2016

Related U.S. Application Data

(63) Continuation of application No. 14/122,884, filed as application No. PCT/KR2012/004564 on Jun. 8, 2012, now Pat. No. 9,285,563.

(30) Foreign Application Priority Data

Jun. 10, 2011 (KR) .................. 10-2011-0056436

(51) Int. Cl.
*G02B 9/60* (2006.01)
*G02B 3/02* (2006.01)
(Continued)

(52) U.S. Cl.
CPC ............... *G02B 9/60* (2013.01); *G02B 3/02* (2013.01); *G02B 13/0045* (2013.01); *G02B 27/0018* (2013.01)

(58) Field of Classification Search
CPC ... G02B 3/02; G02B 3/04; G02B 9/00; G02B 9/60; G02B 9/62; G02B 9/64
(Continued)

(56) References Cited

U.S. PATENT DOCUMENTS

| 7,502,181 B2 | 3/2009 | Shinohara |
| 8,503,111 B2 | 8/2013 | Kwon |

(Continued)

FOREIGN PATENT DOCUMENTS

| CN | 101196611 A | 6/2008 |
| CN | 101819315 A | 9/2010 |

(Continued)

OTHER PUBLICATIONS

European Search Report in European Application No. 12796119.
(Continued)

*Primary Examiner* — Darryl J Collins
(74) *Attorney, Agent, or Firm* — Saliwanchik, Lloyd & Eisenschenk

(57) ABSTRACT

The present invention relates to an imaging lens, the imaging lens including, in an ordered way from an object side, a first lens having positive (+) refractive power, a second lens having negative (−) refractive power, a third lens having positive (+) refractive power, a fourth lens having positive (+) refractive power, and a fifth lens having negative (−) refractive power, wherein an aperture is interposed between the first and second lenses, and the imaging lens meets a conditional expression of $20<V2<30$ and $50<V3,V4,V5<60$, where Abbe's number of second lens is V2, Abbe's number of third lens is V3, Abbe's number of fourth lens is V4, and Abbe's number of fifth lens is V5.

19 Claims, 3 Drawing Sheets

(51) Int. Cl.
*G02B 13/00* (2006.01)
*G02B 27/00* (2006.01)

(58) Field of Classification Search
USPC ........ 359/708, 713, 714, 754–758, 763, 764
See application file for complete search history.

(56) References Cited

U.S. PATENT DOCUMENTS

| | | | | |
|---|---|---|---|---|
| 8,773,767 | B2* | 7/2014 | Chang | G02B 9/60 |
| | | | | 359/714 |
| 2010/0134904 | A1 | 6/2010 | Tsai | |
| 2010/0220229 | A1 | 9/2010 | Sano | |
| 2011/0188131 | A1 | 8/2011 | Sano | |
| 2011/0304928 | A1* | 12/2011 | Abe | G02B 9/60 |
| | | | | 359/764 |
| 2014/0063620 | A1* | 3/2014 | Jung | G02B 13/0045 |
| | | | | 359/714 |

FOREIGN PATENT DOCUMENTS

| | | |
|---|---|---|
| CN | 102047165 A | 5/2011 |
| JP | 07-104180 A | 4/1995 |
| JP | 07-120671 A | 5/1995 |
| JP | 2003222796 A | 8/2003 |
| JP | 2007-264180 A | 10/2007 |
| JP | 2007298572 A | 11/2007 |
| KR | 10-2011-0016152 A | 2/2011 |

OTHER PUBLICATIONS

Office Action dated Jun. 5, 2015 in Chinese Application No. 201280028541.4.
International Search Report in International Application No. PCT/KR2012/004564, filed Jun. 8, 2012.
Office Action dated Feb. 20, 2015 in U.S. Appl. No. 14/122,884.
Office Action dated Jun. 24, 2015 in U.S. Appl. No. 14/122,884.
Notice of Allowance dated Nov. 4, 2015 in U.S. Appl. No. 14/122,884.

* cited by examiner

IMAGING LENS

CROSS-REFERENCE TO RELATED APPLICATIONS

This application is a continuation of U.S. application Ser. No. 14/122,884, filed Nov. 27, 2013; which is the U.S. national stage application of International Patent Application No. PCT/KR2012/004564, filed Jun. 8, 2012; which claims priority to Korean Application No. 10-2011-0056436, filed Jun. 10, 2011, the disclosures of each of which are incorporated herein by reference in their entirety.

TECHNICAL FIELD

The teachings in accordance with exemplary embodiments of this invention relate generally to an imaging lens.

BACKGROUND ART

Recently, vigorous research efforts are being made in the field of a mobile phone-purpose camera module, a digital still camera (DSC), a camcorder, and a PC camera (an imaging device attached to a person computer) all connected with an image pick-up system. One of the most important components in order that a camera module related to such an image pickup system obtains an image is an imaging lens producing an image.

Previously, there have been attempts to construct an imaging lens of high-resolution by using 5 pieces of lenses. Each of 5 pieces of lenses is comprised of lenses with a positive (+) refractive power and lenses with a negative (−) refractive power. For example, an imaging lens is constructed on a structure of PNNPN (+−−+−), PNPNN (+−+−−) or PPNPN (++−+−) in order starting from an object side. However, an imaging module of such a framework fails to show approving optic characteristics or aberration characteristics. Accordingly, a high-resolution imaging lens of a new power structure is required.

DETAILED DISCLOSURE

Technical Problem

Accordingly, embodiments of the present invention may relate to an imaging lens that substantially obviates one or more of the above disadvantages/problems due to limitations and disadvantages of related art, and it is an object of the present invention to provide an imaging lens configured to correct aberration and realize a clear image. Technical problems to be solved by the present invention are not restricted to the above-mentioned, and any other technical problems not mentioned so far will be clearly appreciated from the following description by skilled in the art.

Technical Solution

In one general aspect of the present invention, there is provided an imaging lens, the imaging lens comprising, in an ordered way from an object side: a first lens having positive (+) refractive power; a second lens having negative (−) refractive power; a third lens having positive (+) refractive power; a fourth lens having positive (+) refractive power; and a fifth lens having negative (−) refractive power, wherein an aperture is interposed between the first and second lenses, and the imaging lens meets a conditional expression of 20<V2<30 and 50<V3,V4,V5<60, where Abbe's number of second lens is V2, Abbe's number of third lens is V3, Abbe's number of fourth lens is V4, and Abbe's number of fifth lens is V5.

Preferably, but not necessarily, an object side surface of the first lens is convexly formed.

Preferably, but not necessarily, the second lens takes a concave form at an upper side surface.

Preferably, but not necessarily, the third, fourth and fifth lenses respectively take a meniscus form convexly formed at an upper side surface.

Preferably, but not necessarily, any one lens or more lenses from the first, second, third, fourth and fifth lenses take an aspheric form.

Preferably, but not necessarily, the imaging lens meets a conditional expression of 0.5<f1/f<1.5, where f is an entire focus distance of the imaging lens, and f1 is a focus distance of the first lens.

Preferably, but not necessarily, the imaging lens meets a conditional expression of 0.5<ΣT/f<1.5, where f is an entire focus distance of the imaging lens, and ΣT is a distance from an object side surface of the first lens to an image-forming surface.

Preferably, but not necessarily, the imaging lens meets a conditional expression of 1.6<N2<1.7, where N2 is a refractive index of the second lens.

Advantageous Effects

The imaging lens according to the present invention has advantageous effects in that flare can be reduced by interposing a separate aperture between a first lens and a second lens to correct aberration and to realize a clear image and by constructing the imaging lens with 5 pieces of lenses comprised of first, second, third, fourth and fifth lenses.

BEST MODE

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

Figure 1:
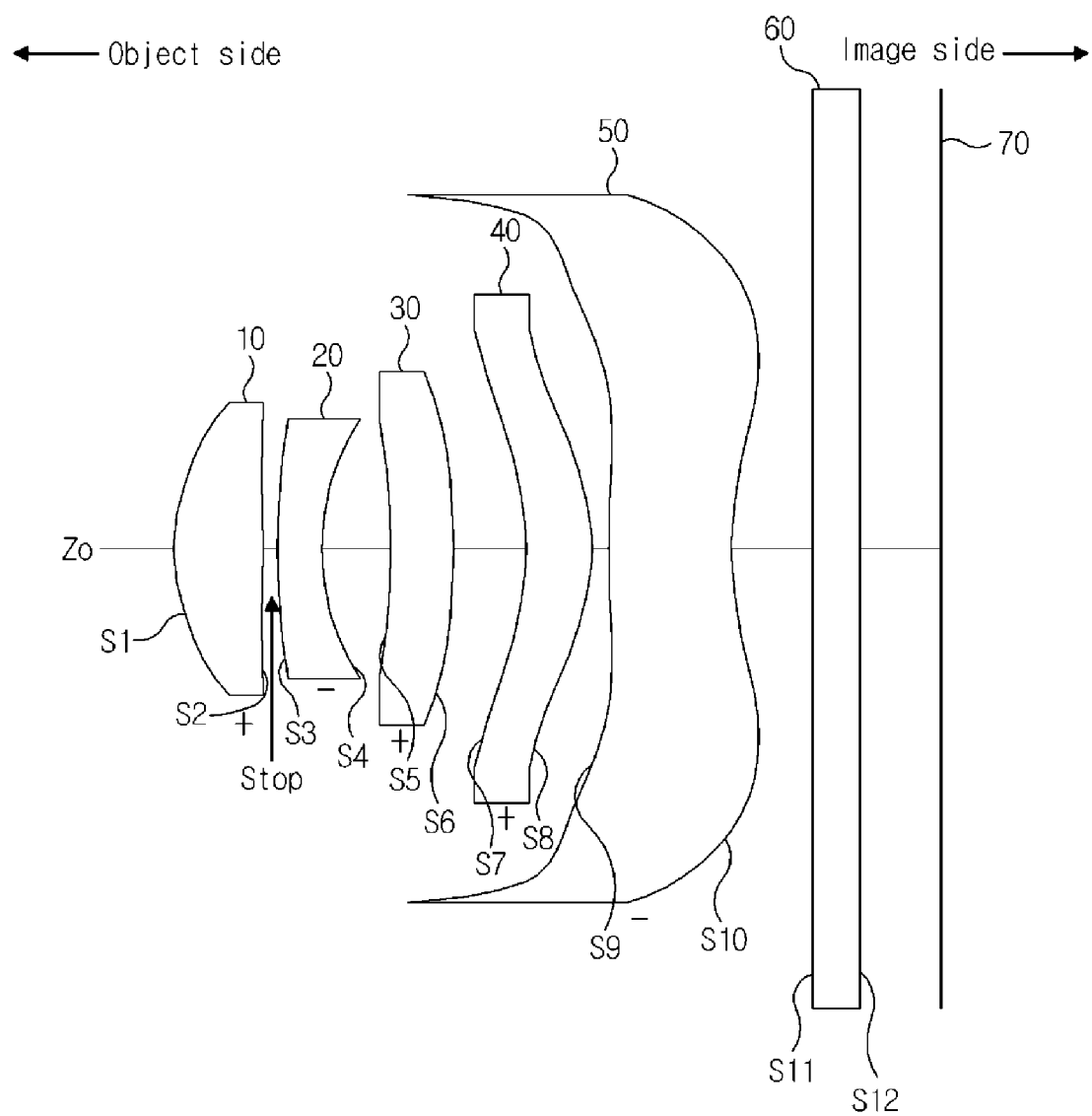
FIG. 1 is a constructional view illustrating a camera module lens according to the present invention.
Figure 2:
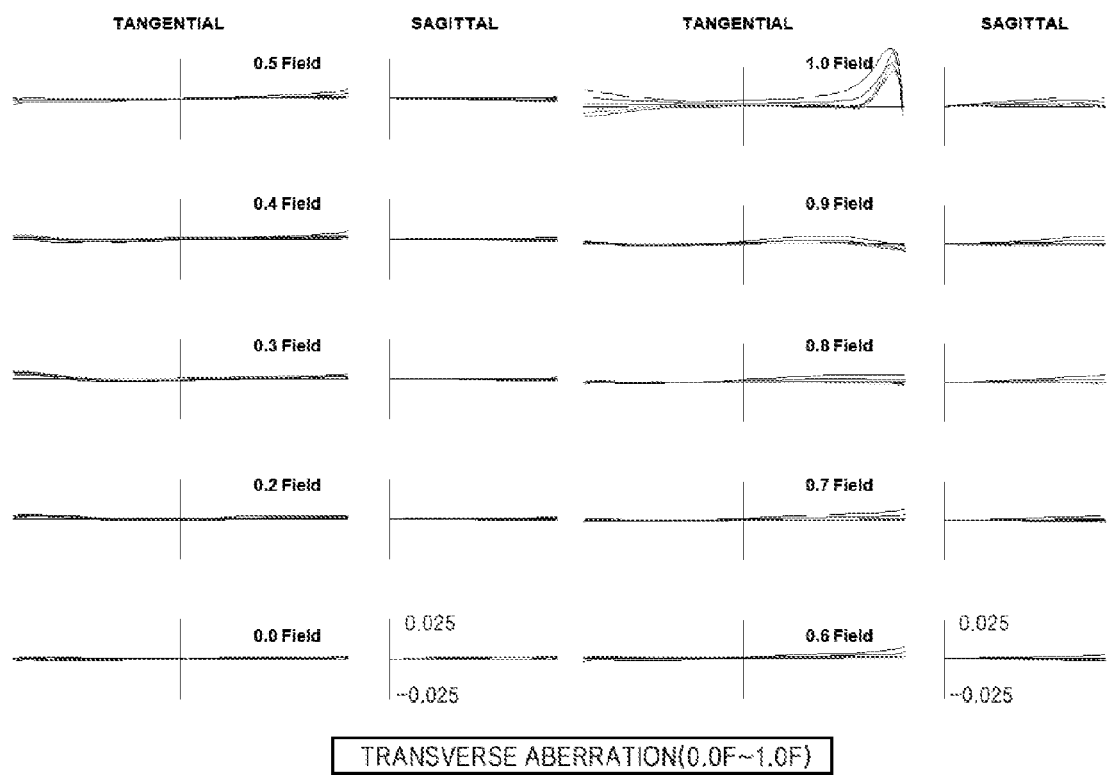
FIG. 2 is a graph measuring coma aberration according to an exemplary embodiment of the present invention.
Figure 3:
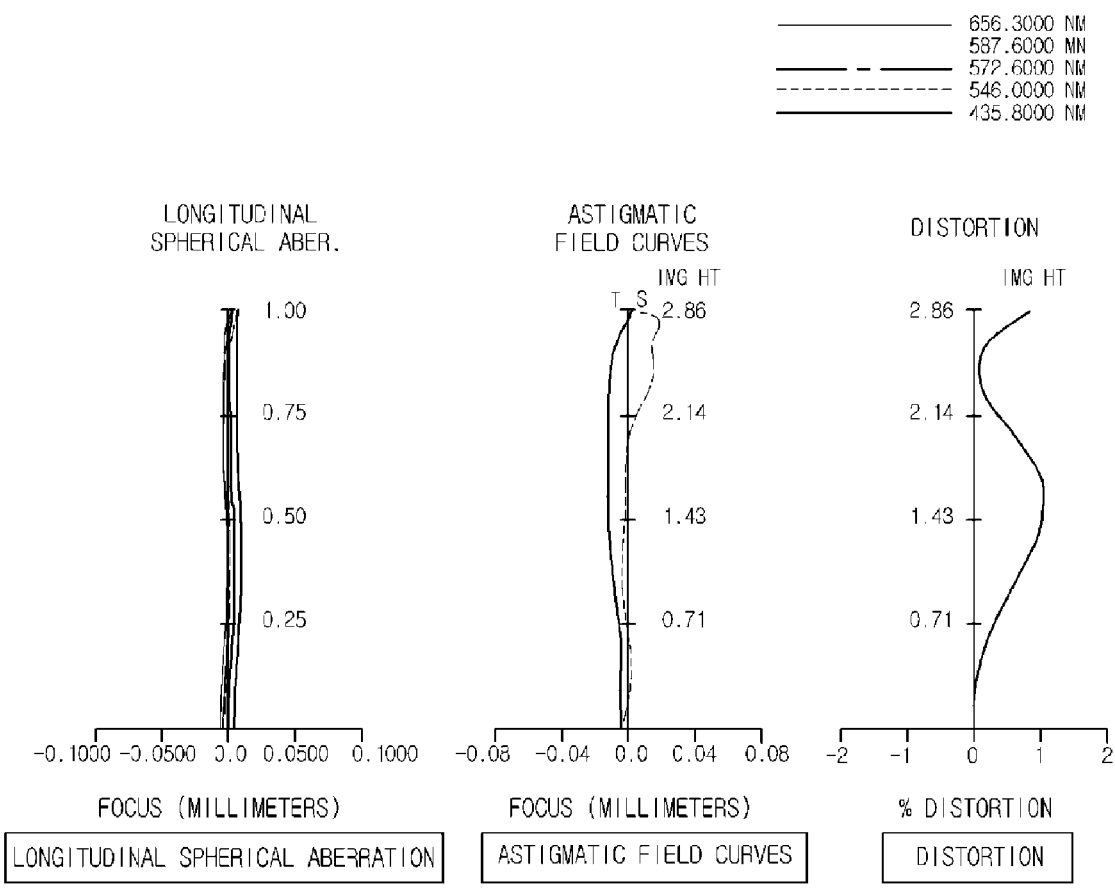
FIG. 3 is a graph illustrating an aberration according to an exemplary embodiment of the present invention.

The disclosed embodiments and advantages thereof are best understood by referring to FIGS. 1-3 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

It will be understood that the terms "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof are used in the detailed description and/or the claims to denote non-exhaustive inclusion in a manner similar to the term "comprising".

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted. Now, the present invention will be described in detail with reference to the accompanying drawings.

Words such as "thus," "then," "next," "therefore", etc. are not intended to limit the order of the processes; these words are simply used to guide the reader through the description of the methods.

It will be understood that when an element is referred to as being "connected" or "coupled" to another element, it can be directly connected or coupled to the other elements or intervening elements may be present. In contrast, when an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. For example, a first region/layer could be termed a second region/layer, and, similarly, a second region/layer could be termed a first region/layer without departing from the teachings of the disclosure. The terminology used herein is for the purpose of describing particular embodiments only and is not intended to be limiting of the general inventive concept. As used herein, the singular forms "a", "an" and "the" are intended to include the plural forms as well, unless the context clearly indicates otherwise.

Now, the imaging lens according to exemplary embodiments of the present invention will be described in detail with reference to the accompanying drawings.

FIG. 1 is a constructional view illustrating an imaging lens according to an exemplary embodiment of the present invention.

The imaging lens comprised of a plurality of lenses is arranged about an optical axis (ZO), a thickness, size, and shape of each lens are rather overdrawn in FIG. 1 for description, and a spherical shape or an aspheric shape has been only presented as one exemplary embodiment, but obviously not limited to this shape.

Referring to FIG. 1, a camera lens module according to the present invention includes, in an ordered way from an object side, a first lens (10), a second lens (20), a third lens (30), a fourth lens (40), a fifth lens (50), a filter (60) and a photo-detector (70).

Light corresponding to image information of a subject is incident on the photo-detector (70) by passing the first lens (10), the second lens (20), the third lens (30), the fourth lens (40), the fifth lens (50) and the filter (60).

The imaging lens according to the present invention includes five pieces of lenses including the first lens (10), the second lens (20), the third lens (30), the fourth lens (40) and the fifth lens (50), such that the imaging lens according to the present invention has an advantageous effect in that flare can be reduced by interposing a separate aperture between a first lens and a second lens to correct aberration and to realize a clear image and by constructing the imaging lens with 5 pieces of lenses comprised of first, second, third, fourth and fifth lenses.

Hereinafter, in the description of the construction of each lens, "object side surface" means the surface of a lens facing an object side with respect to an optical axis, "image side surface" means the surface of the lens facing an imaging surface with respect to the optical axis, and upper side surface" means the surface of the lens a capturing surface with respect to an optical axis.

In the specification, "imaging" basically may refer to the process in which an imaging lens receives light from a subject in the field and outputs an image (image signal and image data) indicating the same. However, if the imaging lens is repeatedly generating the image indicating the subject in the field at a predetermined cycle, "imaging" may mean the process of storing a specific image out of the images generated by the imaging lens in a storage unit. In other words, from a certain standpoint, "imaging" may mean a process in which the imaging lens acquires an image indicating the content of the subject in the field and having the same in a state subjectable to the measurement process at a certain intended timing.

The first lens (10) has positive (+) refractive power, and is convexly formed at an object side surface (S1). The second lens (20) has negative (−) refractive power, and is concavely formed at an upper side surface (S4). Furthermore, a separate aperture is interposed between the first and second lenses (10, 20). In addition, the third and fourth lenses (30, 40) have positive (+) refractive power, and the fifth lens (50) has negative (−) refractive power. As illustrated, the third lens (30) takes a meniscus form convexly formed at an upper side surface (S6), the fourth lens (40) takes a meniscus form convexly formed at an upper side surface (S8), and the fifth lens (50) ≒ takes a meniscus form convexly formed at an upper side surface (S19).

For information, 'S2' of FIG. 1 is an upper side surface of the first lens (10), 'S3' is an object side surface of the second lens (20), 'S5' is an upper side surface of the third lens (30), 'S7' is an object side surface of the fourth lens (40), 'S9' is an object side surface of the fifth lens (50), and 'S11' and 'S12' are respectively object side surface and upper side surface of the filter (60).

Furthermore, one or more lenses of the first to fifth lenses (10, 20, 30, 40, 50) may be formed with aspheric shape. The filter (60) may be any one optical filter selected from an infrared filter and a cover glass. The filter (60), if applied with the infrared filter, blocks radiant heat emitted from external light from being transferred to the photo-detector (70). Furthermore, the infrared filter transmits visible light and reflects infrared rays to output it to the outside.

The photo-detector (70) is an image sensor, for example, CCD (Charge Coupled Device) or CMOS (Complementary Metal Oxide Semiconductor), etc.

The first lens (10), the second lens (20), the third lens (30), the fourth lens (40) and the fifth lens (50) respectively use an aspheric lens as later-described in the exemplary embodiments, to possibly improve resolution of a lens and have a good point of superior aberration property.

Furthermore, the imaging lens of the present invention is formed with an aperture interposed between the first lens (10) and the second lens (20) to reduce flare and determine a stable CRA (Chief Ray Angle) curve, and to realize a high picture quality when combined with a sensor.

Because the later-described conditional expressions and exemplary embodiments are preferred embodiments enhancing an effect of interaction, it would be obvious to those skilled in the art that the present invention is not necessarily comprised of the following conditions. For example, only by satisfying some conditions of later-described conditional expressions, the lens construction (framework) of the present invention may have an enhanced effect of interaction.

$0.5 < f1/f < 1.5$ [Conditional expression 1]

$0.5 < \Sigma T/f < 1.5$ [Conditional expression 2]

$1.6 < N2 < 1.7$ [Conditional expression 3]

$20 < V2 < 30$ [Conditional expression 4]

$50 < V3, V4, V5 < 60$ [Conditional expression 5]

where, f: an entire focus distance of the imaging lens
f1: a focus distance of the first lens
$\Sigma T$: a distance from object side surface of the first lens to an image-forming surface
N2: refractive index of second lens
V2, V3, V4, V5: Abbe's numbers of the second to fifth lenses Conditional expression 1 specifies refractive power of the first lens (10), The first lens (10) has refractive power having an appropriate compensation of spherical aberration and appropriate chromatic aberration according to the conditional expression 1. The conditional expression 2 specifies dimension of optical axis direction of the entire optical system, and it is a condition for ultra-small lens and a condition for appropriate aberration compensation.

Conditional expression 3 specifies refractive index of the second lens (20), conditional expression 4 specifies Abbe's number of second lens (20), and conditional expression 5 specifies Abbe's numbers of third, fourth and fifth lenses (30, 40, 50). The specification of Abbe's number of each lens is a condition for better compensation of chromatic aberration.

Hereinafter, the action and effect of the present invention will be described with reference to a specific exemplary embodiment. Aspheric mentioned in a later-exemplary embodiment is obtained from a known Equation 1, and 'E and its succeeding number' used in Conic constant k and aspheric coefficient A, B, C, D, E, F indicates 10's power. For example, E+01 denotes 10.sup.1, and E−02 denotes 10.sup.−2.

$$z = \frac{cY^2}{1 + \sqrt{1 - (1+K)c^2 Y^2}} + AY^4 + BY^4 + CY^4 + DY^4 + EY^4 + FY^4 + \ldots \quad \text{Equation 1}$$

where, z: distance from the lens's top-point to an optical axis direction, c: basic curvature of a lens, Y: distance towards a direction perpendicular to an optical axis, K: conic constant, and A, B, C, D, E, F: aspheric coefficients Exemplary Embodiments The following Table 1 shows an exemplary embodiment matching the aforementioned conditional expressions.

TABLE 1

|  | Exemplary embodiments |
|---|---|
| f | 4.13 |
| f1 | 2.56 |
| f2 | −3.64 |
| f3 | 9.73 |
| f4 | 10.25 |
| f5 | −5.79 |
| \|f2/f1\| | 1.42 |
| $\Sigma T$ | 4.7 |
| $\Sigma T/f$ | 1.138 |

Referring to Table 1, it can be noted that f1/f is 0.619 that matches the conditional expression 1, and $\Sigma T/f$ is 1.138 that matches the conditional expression 2.

The following Table 2 shows an exemplary embodiment which is a more detailed exemplary embodiment over that of Table 1.

TABLE 2

| Surface number | Curvature radius (R) | Thickness or distance(d) | Refractive index (N) | materials |
|---|---|---|---|---|
| 1* | 1.45 | 0.54 | 1.54 | Plastic |
| 2* | −30.9 | 0.01 |  |  |
| (stop) | 0.00 | 0.10 |  |  |
| 4* | 4.81 | 0.28 | 1.64 | Plastic |
| 5* | 1.53 | 0.39 |  |  |
| 6* | −17.20 | 0.40 | 1.53 | Plastic |
| 7* | −4.02 | 0.45 |  |  |
| 8* | −1.48 | 0.40 | 1.59 | Plastic |
| 9* | −1.31 | 0.10 |  |  |
| 10* | 3.75 | 0.79 | 1.53 | Plastic |
| 11* | 1.57 | 0.50 |  |  |
| 12 | 0.00 | 0.30 | 1.52 | IR-filter |
| 13 | 0.00 | 0.49 |  |  |
| image | 0.00 | 0.00 |  |  |

The notation * in the above Table 2 and following Table 3, which is further written near the surface number indicates aspheric. The following Table 3 shows a value of aspheric coefficient of each lens in the exemplary embodiment of Table 2.

TABLE 3

| Surface number | k | A | B | C | D |
|---|---|---|---|---|---|
| 1* | −0.017728 | 0.628476E−02 | 0.152202E−01 | 0.638397E−02 | 0.458047E−02 |
| 2* | 0.000000 | 0.261702E−01 | 0.349096E−01 | −0.335264E−01 | −0.456028E−02 |
| 4* | −71.865663 | −0.745618E−02 | 0.500326E−01 | −0.488897E−01 | −0.673676E−03 |
| 5* | −2.031149 | −0.353626E−01 | 0.172119E+00 | −0.741018E−01 | −0.251820E−01 |
| 6* | 0.000000 | −0.869724E−01 | −0.724965E−02 | 0.311328E−01 | 0.176204E−01 |
| 7* | 8.781701 | −0.358819E−01 | −0.331210E−02 | 0.147494E−01 | 0.945970E−02 |
| 8* | −8.051573 | −0.352205E−01 | 0.544751E−01 | −0.561835E−01 | 0.400188E−01 |
| 9* | −2.070879 | 0.842341E−01 | −0.501933E−01 | 0.308768E−01 | −0.955785E−02 |
| 10* | −65.990395 | −0.101702E+00 | 0.234127E−01 | −0.248579E−02 | −0.248383E−04 |
| 11* | −10.265610 | −0.683924E−01 | 0.176615E−01 | −0.555727E−02 | 0.864770E−03 |

Mode For Invention

FIG. 2, as a graph measuring coma aberration, is a graph illustrating coma aberration according to an exemplary embodiment of the present invention, where tangential aberration and sagittal aberration of each wavelength based on a field height are measured. In FIG. 2, it is interpreted that a coma aberration correcting function is good as curves approach the X axis from a positive axis and a negative axis. In a shown aberration diagram, because values of images in nearly all fields proximate to the X axis, coma aberration correction function demonstrates a superior figure.

FIG. 3 is a graph illustrating spherical aberration according to an exemplary embodiment of the present invention. That is, FIG. 3 is a graph measuring longitudinal spherical aberration, astigmatic field curves and distortion in order from left side. In FIG. 3, a Y axis means size of an image, and an X axis means focal distance (unit: mm) and distortion degree (unit: %). In FIG. 3, it is interpreted that an aberration correcting function is good as curves approach the Y axis. In the shown aberration diagram, because values of images in nearly all fields appear proximate to the Y axis, longitudinal spherical aberration, astigmatic field curves and distortion all demonstrate a superior figure.

That is, a range of the longitudinal spherical aberration is −0.007 mm~+0.008 mm, a range of astigmatic field curves is −0.018 mm~+0.004 mm, and a range of distortion is 0.00 mm~+1.00 mm, such that the imaging lens according to the present invention can correct the characteristics of longitudinal spherical aberration, astigmatic field curves and distortion, whereby the imaging lens according to the present invention has an excellent lens characteristics.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

As apparent from the foregoing, the imaging lens according to the exemplary embodiments of the present invention has an industrial applicability in that flare can be reduced by interposing a separate aperture between a first lens and a second lens to correct aberration and to realize a clear image and by constructing the imaging lens with 5 pieces of lenses comprised of first, second, third, fourth and fifth lenses.

What is claimed is:

1. An imaging lens, the imaging lens comprising, in an order from an object side to an image side:
   a first lens having positive (+) refractive power;
   a second lens having negative (−) refractive power;
   a third lens having positive (+) refractive power;
   a fourth lens having positive (+) refractive power; and
   a fifth lens having negative (−) refractive power,
   wherein an image side surface of the first lens is convexly formed,
   wherein the third lens has an image side surface taking a convexly formed meniscus shape,
   wherein the fourth lens has an image side surface taking a convexly formed meniscus shape,
   wherein an object side surface of the fifth lens is convexly formed, and
   wherein the imaging lens meets a conditional expression of $0.5 < f1/f < 1.5$, where f is an entire focus distance of the imaging lens, and f1 is a focus distance of the first lens.

2. The imaging lens of claim 1, wherein an object side surface of the first lens is convexly formed.

3. The imaging lens of claim 1, wherein the second lens takes a concave form at an image side surface.

4. The imaging lens of claim 1, wherein the fifth lens takes a meniscus shape.

5. The imaging lens of claim 1, wherein one or more lenses from the first, second, third, fourth, and fifth lenses take an aspheric form.

6. The imaging lens of claim 1, wherein an aperture is disposed between the first and second lenses.

7. The imaging lens of claim 1, wherein the imaging lens meets a conditional expression of $0.5 < \Sigma T/f < 1.5$, where f is the entire focus distance of the imaging lens, and $\Sigma T$ is a distance from an object side surface of the first lens to an image-forming surface.

8. The imaging lens of claim 1, wherein the imaging lens meets a conditional expression of $1.6 < N2 < 1.7$, where N2 is a refractive index of the second lens.

9. The imaging lens of claim 1, wherein the imaging lens meets a conditional expression of $20 < V2 < 30$, $50 < V3 < 60$, $50 < V4 < 60$ and $50 < V5 < 60$, where Abbe's number of the second lens is V2, Abbe's number of the third lens is V3, Abbe's number of the fourth lens is V4, and Abbe's number of the fifth lens is V5.

10. A camera module, comprising:
    an image sensor; and
    the imaging lens of claim 1.

11. A mobile phone, comprising the camera module of claim 10.

12. An imaging lens, the imaging lens comprising, in an order from an object side to an image side:

a first lens having positive (+) refractive power;
a second lens having negative (−) refractive power;
a third lens having positive (+) refractive power;
a fourth lens having positive (+) refractive power; and
a fifth lens having negative (−) refractive power,
wherein an image side surface of the first lens is convexly formed,
wherein the third lens has an image side surface taking a convexly formed meniscus shape,
wherein the fourth lens has an image side surface taking a convexly formed meniscus shape,
wherein an object side surface of the fifth lens is convexly formed and the fifth lens takes a meniscus shape.

13. The imaging lens of claim 12, wherein an object side surface of the first lens is convexly formed.

14. The imaging lens of claim 12, wherein the second lens takes a concave form at an image side surface.

15. The imaging lens of claim 12, wherein one or more lenses from the first, second, third, fourth, and fifth lenses take an aspheric form.

16. The imaging lens of claim 12, wherein an aperture is disposed between the first and second lenses.

17. The imaging lens of claim 12, wherein the imaging lens meets a conditional expression of $0.5<\Sigma T/f<1.5$, where f is an entire focus distance of the imaging lens, and $\Sigma T$ is a distance from an object side surface of the first lens to an image-forming surface.

18. The imaging lens of claim 12, wherein the imaging lens meets a conditional expression of $1.6<N2<1.7$, where N2 is a refractive index of the second lens.

19. The imaging lens of claim 1, wherein the imaging lens meets a conditional expression of $20<V2<30$, $50<V3<60$, $50<V4<60$ and $50<V5<60$, where Abbe's number of the second lens is V2, Abbe's number of the third lens is V3, Abbe's number of the fourth lens is V4, and Abbe's number of the fifth lens is V5.

* * * * *